Aug. 19, 1969     A. B. MOJONNIER     3,461,756
METHOD FOR TRIMMING PLASTIC PREFORMS
Original Filed April 20, 1967     4 Sheets-Sheet 4

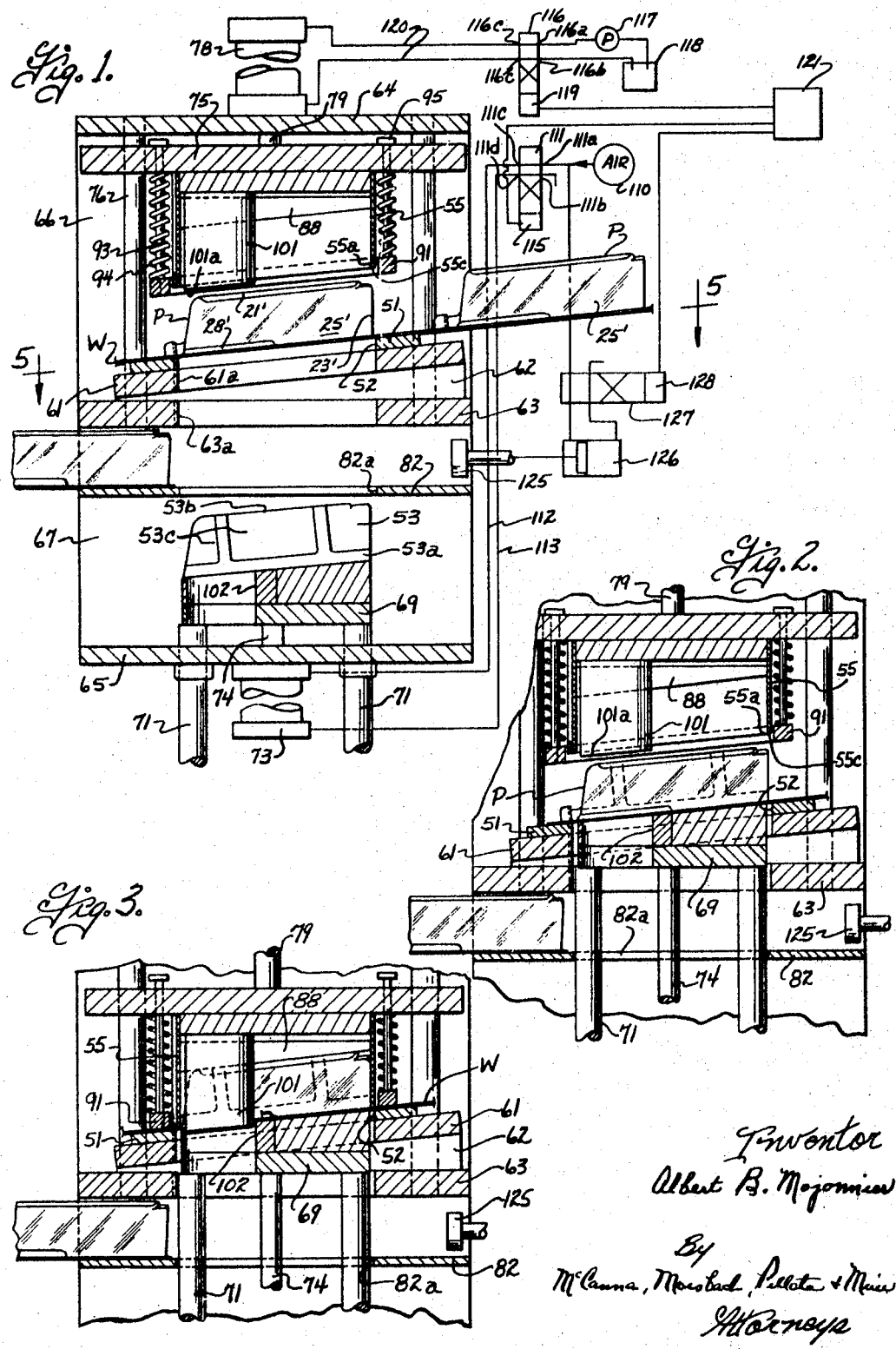

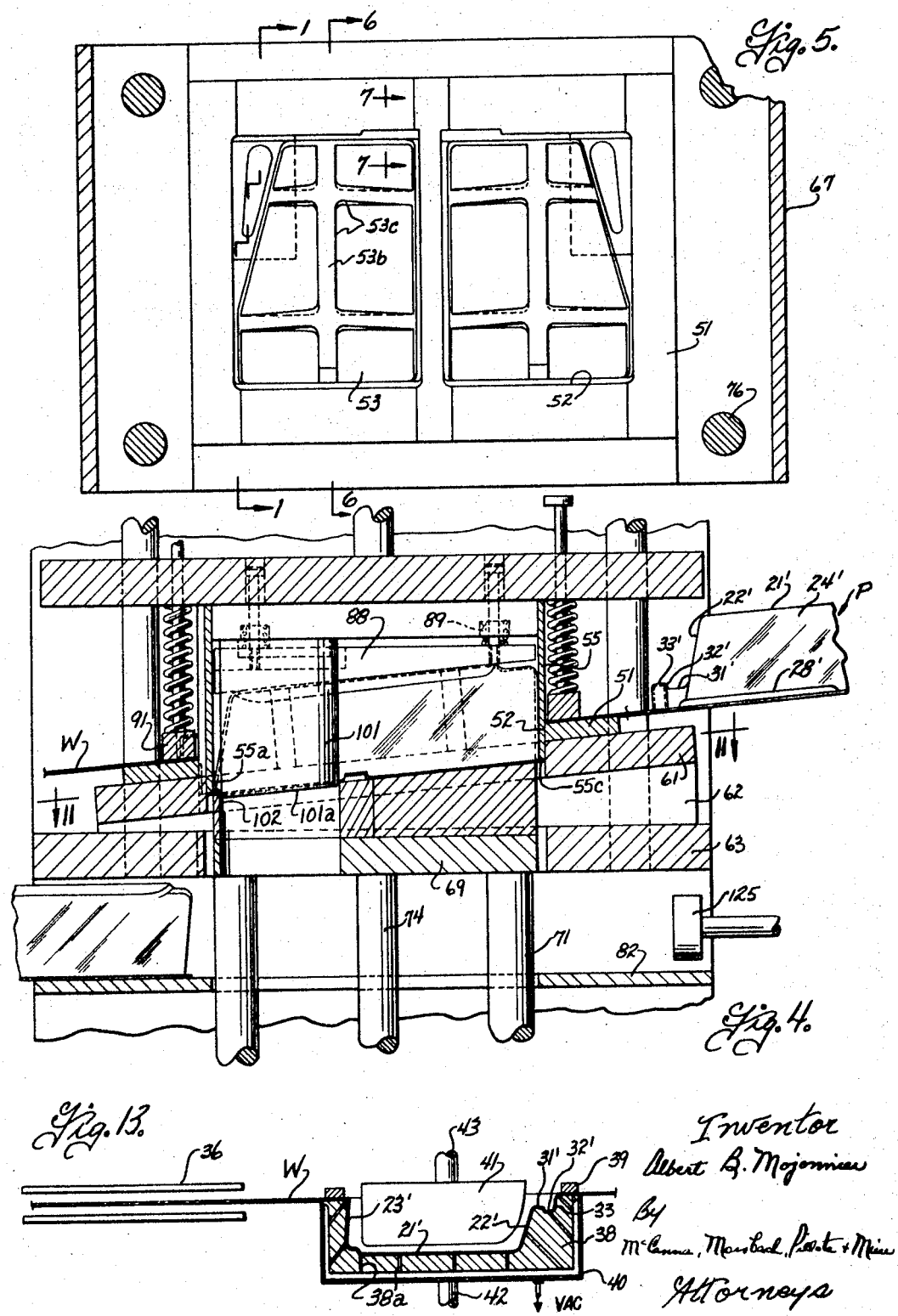

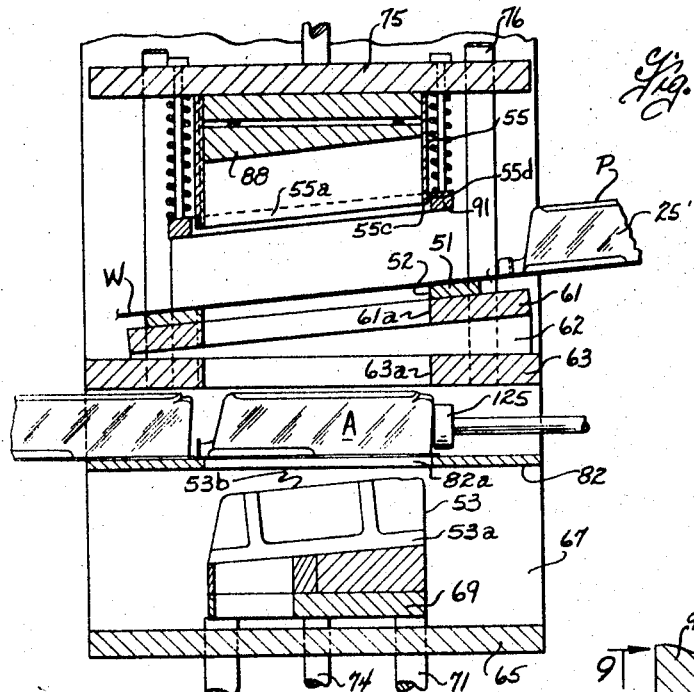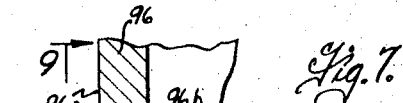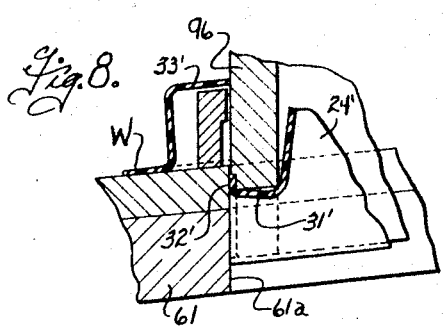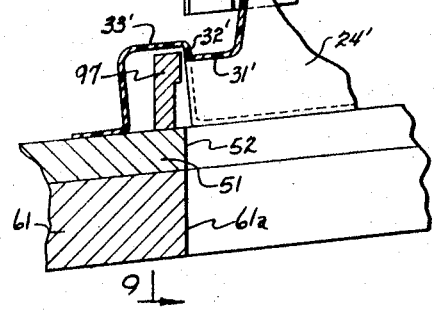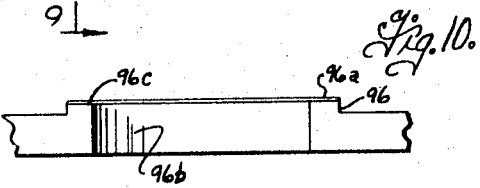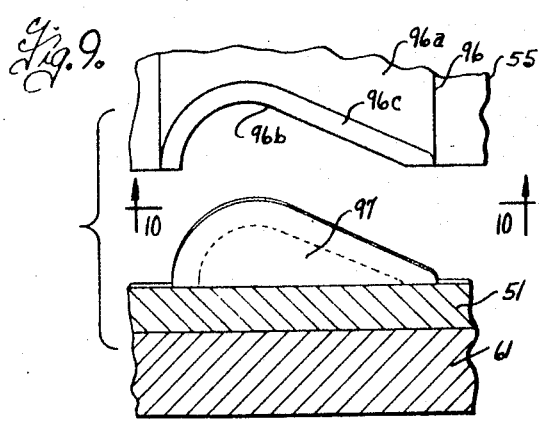

Inventor
Albert B. Mojonnier
By
McCanna, Morsbach, Pillote + Muir
Attorneys 3,461,756
METHOD FOR TRIMMING PLASTIC PREFORMS
Albert B. Mojonnier, Chicago, Ill., assignor to Albert Mojonnier, Inc., Franklin Park, Ill., a corporation of Illinois
Original application Apr. 20, 1967, Ser. No. 632,268. Divided and this application Dec. 4, 1968, Ser. No. 781,194
Int. Cl. B29c 17/08; B29h 3/06
U.S. Cl. 83—17
6 Claims

ABSTRACT OF THE DISCLOSURE

A method and apparatus for trimming cup-shaped preforms with a marginal flange from a web of plastic material where the preform is first clamped between an outer punch member that engages the outer side of the preform and an inner shaping member that engages the inner side of the preform, and the punch and shaping members are then moved in unison with the preform clamped therebetween through a trimming die to punch the preform from the web.

Cross-reference

This application is a division of copending application Ser. No. 632,268, filed Apr. 20, 1967, entitled "Method and Apparatus for Trimming Articles."

Background of the invention

The invention relates to forming of flanged cup-shaped articles and particularly to a method and apparatus for trimming thermoformed articles from a sheet of plastic to provide a marginal flange on the articles. It is common practice to thermoform cup-shaped articles by preforming cup-shaped impressions in a heat-softened web of thermolastic material and to thereafter trim the cup-shaped preform from the web using a punch and die to provide a cup-shaped article with a marginal flange. The thermoformed articles, however, are subject to nonuniform shrinkage and distortion after forming, and difficulties have been encountered in achieving uniformity in the flange size on successively trimmed articles.

Summary of the invention

A method and apparatus for trimming cup-shaped preforms from a web of thermoplastic material to provide uniform flanges on successively trimmed articles notwithstanding any variations in the size and shape of the preforms due to shrinkage, warping and the like during cooling and aging of the preform. In order to compensate for variations in size and shape of the preforms, the latter are engaged between inner and outer shaping members to reshape the preform while it is still in the web; a punch face on one of the shaping members is engaged with the web in a marginal area around the preform, and the shaping members are then moved in unison relative to a trim die while the preform is clamped therebetween to press the punch face through the web and into the trim die to thereby punch the preform from the web, leaving a marginal flange on the preform. The method and apparatus is adapted for trimming preforms having a localized flange portion extending transverse to the plane of the web. The method and apparatus is also adapted for trimming preforms which have one wall reversely inclined, that is, at an angle of less than 90° with respect to the plane of the web, by moving the shaping members relative to each other and relative to the trim die along paths generally paralleling the reversely inclined wall of the preform. The method and apparatus is further adapted for punching openings in the preform inwardly of the margin thereof by providing an appropriately shaped hole punch and die on the mating faces of the inner and outer shaping members to punch a hole in the preform as the inner and outer shaping members are moved into their preform-engaging position.

Brief description of the drawings

FIGURE 1 is a fragmentary vertical sectional view through a trimming apparatus taken on the plane 1—1 of FIG. 5, and with the controls for the trimming apparatus shown diagrammatically;

FIG. 2 is a fragmentary vertical sectional view taken on the plane 1—1 of FIG. 5 and illustrating movement of the inner shaping member into engagement with the preform;

FIG. 3 is a fragmentary vertical sectional view taken on the plane 1—1 of FIG. 5 illustrating movement of the outer shaping member into engagement with the preform;

FIG. 4 is a fragmentary vertical sectional view taken on the plane 1—1 of FIG. 5 illustrating on a larger scale the position of the part during punching of the preform from the web;

FIG. 5 is a sectional view taken on the plane 5—5 of FIG. 1 and illustrating the trim die and inner shaping member;

FIG. 6 is a fragmentary vertical sectional view taken on the plane 6—6 of FIG. 5;

FIGS. 7 and 8 are fragmentary views taken on the plane 7—7 of FIG. 5 and illustrating the parts on a larger scale;

FIG. 9 is a fragmentary sectional view taken on the plane 9—9 of FIG. 7;

FIG. 10 is a fragmentary view taken on the plane 10—10 of FIG. 9;

FIG. 13 is a diagrammatic view illustrating thermoforming of the cup-like halves.

Description of the preferred embodiment

Figure 11:
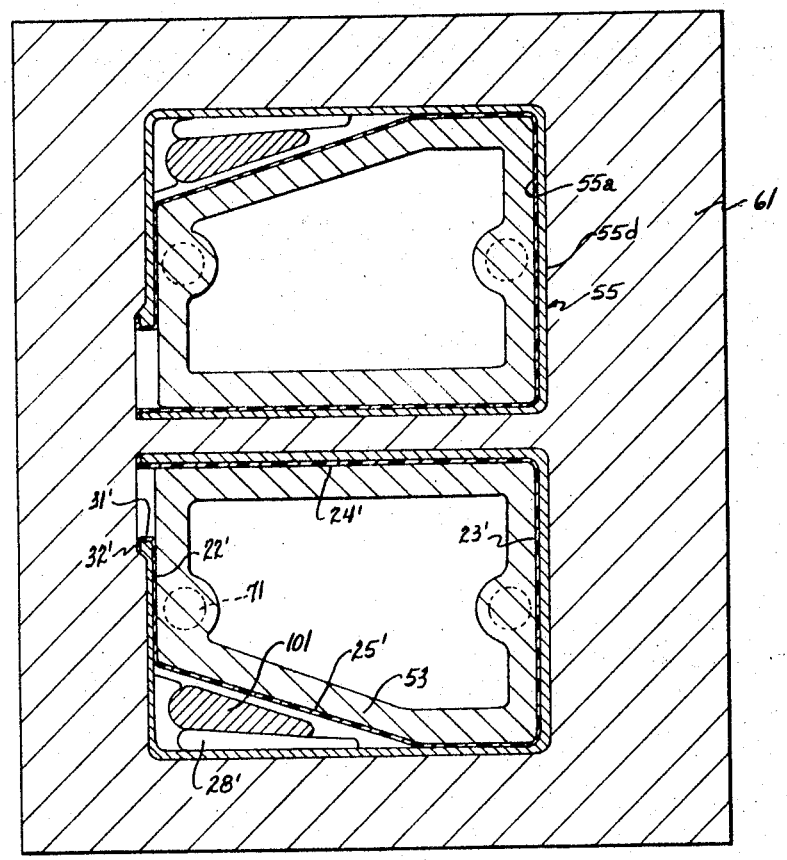
FIG. 11 is a horizontal sectional view taken on the plane 11—11 of FIG. 4, but on a smaller scale than FIG. 4.
Figure 12:
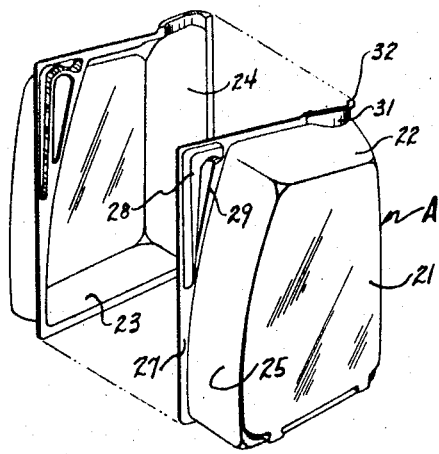
FIG. 12 is a perspective exploded view of a container formed from two cup-shaped halves of a type adapted to be trimmed by the method and apparatus of the present invention.

The method and apparatus of the present invention is generally adapted for trimming cup-shaped preforms from a web of thermoplastic material, for example polyethylene, polystyrene, polypropylene, vinyl polymers and copolymers, etc. For the purpose of illustrating the invention, it is herein shown and described in connection with the trimming of cup-shaped bodies or articles A used in the formation of containers of the type illustrated in FIG. 12. As illustrated therein, each container half includes a face panel 21, a marginal side wall including top and bottom panels 22 and 23 and front and rear panels 24 and 25. A marginal flange 27 extends outwardly from the side walls adjacent the open end of the cup-shaped body, and the width of the flange can be different at different areas of the body, as is shown in FIG. 12. In the particular article illustrated, the bottom panel 23 is reversely inclined, that is, is inclined at an angle of less than 90° with respect to the plane of the flange to provide a recess at the bottom of the completed container for receiving the flange portion at the bottom of the container. The cup-shaped body may also be formed with a handle-forming impression shown at 28 inwardly of the margin of the flange 27 and a finger-receiving opening 29 in the flange between the handle impression and the rear panel 25 of the article. The body may also be formed with a generally U-shaped spout-forming impression 31 herein shown extending from the top panel 22 and a spout flange 32 which extends outwardly from the spout in a direction transverse to the plane of the flange 27 and in spaced relation to the adjacent top panel 22 of the body. The method and apparatus is arranged to trim the cup-shaped bodies from the web, and although a particular cup-shaped body having a reverse bottom, handles, handle-opening spout and spout flange is herein shown for purpose of illustration, it is to be understood that the method and apparatus of the present invention can also be employed for trimming cup-shaped bodies which do not have one or all of the above mentioned features, as well as cup-shaped bodies of different size and shape from that specifically shown herein.

The preforms may be molded and shaped in any suitable manner, but are commonly formed of a thermoplastic material in a fluid pressure forming process wherein fluid pressure is used to press a heat-softened sheet of thermoplastic material into conformity with the shape of a mold. Either vacuum or air at greater than atmospheric pressure may be used to press the sheet into engagement with the mold, and the mold may be of either the male or female type. The sheet or web of material may be formed into the shape of the article while it is still in a heat-softened condition from the apparatus which initially produces the sheet or, as shown in FIG. 13 of the drawings, the sheet 35 may be heated by one or more heaters 36 of conventional construction. In order to reduce the over-all time required for heating and to provide more uniform heating of the sheet material, it is preferable to employ the dual heaters arranged at opposite sides of the sheet as shown in FIG. 13. The cup-like sections are preferably formed by the so-called plug-assist method of forming articles from thermoplastic material which includes a female molding member 38; a means such as clamps 39 for clamping the heat-softened sheet to the mold; and a male mold member 41, commonly referred to as an assist plug. Any suitable mechanism may be provided for effecting relative movement of the mold, sheet and assist plug in the direction transverse to the sheet to bring the mold into engagement with one side of the sheet and to move the assist plug into the mold cavity from the other side of the sheet and, as diagrammatically illustrated, actuators are connected as indicated at 42 and 43 to the mold and assist plug to effect relative movement of the same. The female mold 38 has a cavity which communicates with the vacuum chamber 40 through passages 38a. The mold cavity is shaped in the form of the preform and like numerals followed by the subscript prime (′) are used to designate the parts of the preform P corresponding to those of the cup-shaped article A. Thus, the preform includes a face panel 21′, top and bottom panels 22′, 23′, front and rears panel 21′, 25′, and handle-forming impression 28′. In addition, the preform includes a spout-forming impression having a spout portion 31′, a spout flange portion 32′ and a wall portion 33′ extending from the outer periphery of the spout flange portion 32′ to the plane of the web.

The preforms P are thereafter trimmed from the web W along a line spaced outwardly from the side walls of the preforms at least along the major portion thereof to provide a marginal flange on the preforms. The preforms are, however, subject to variable distortion and shrinkage, believed to be due to various factors such as initial stresses in the web before preforming; stresses produced in the material during the preforming operation; differences in rate of cooling of different parts as well as different thicknesses of different parts of the preform, etc. In order to compensate for variations in shape due to distortion and shrinkage of the preform and to enable accurate control over the flange size on the trimmed preform, at least some and preferably all of the side walls of the preform are engaged in the region adjacent the web between inner and outer shaping members to conform the open side of the preform to the preselected shape of the shaping members. A punch face on one of the shaping members is engaged with one side of the web in a marginal area extending outwardly from the side walls of the preform, and relative movement is then effected between the shaping members and a trim die having an opening shaped complementary to the outer margin of the punch face while the shaping members are maintained in engagement with the preform to punch the article with a marginal flange from the web of plastic material. When the preform is of the type having a flange portion such as shown at 32′ extending transverse to the plane of the web, the transversely extending flange portion is advantageously trimmed from the wall portion 33′ in the same operation used in trimming the body of the preform from the web. In preforms having a reversely inclined wall such as the bottom panel 23′, the flange portion along the reversely inclined wall can be trimmed from the web along a line not substantially outwardly of the perpendicular projection of the bottom wall on the web by moving the outer shaping member relative to the preform and trim die along a path generally paralleling the reversely inclined wall of the preform. In order to form articles having punched openings inwardly of the margin thereof, it is advantageous to punch the opening in the preform while it is engaged by the inner and outer shaping members and preferably by interfitting hole punch and dies on the inner and outer shaping members which punch the hole in the preform as the inner and outer shaping members are moved into positions clamping the preform therebetween.

As shown in FIG. 1, the preform P while in the web W of material is advanced, either manually or by some automatic mechanism, to a position at one side of a trim die 51 having a die opening 52 shaped to correspond to the desired outline of the flange on the trimmed article. An inner shaping member 53 is shaped to engage the inner side of the side walls of the preform at least in the region adjacent the web to expand the side walls of the preform outwardly in the event the side walls have undergone any inward distortion or shrinking. For this purpose, the inner shaping member is formed with a rim portion 53a which is preferably but not necessarily continuous as shown in FIG. 1 and which is shaped to generally conform to the inner side of an undistorted preform in the region adjacent the juncture of the side walls of the preform with the web. In order to control positioning of the rim portion 53a of the preform adjacent the open side of the preform, the inner shaping member is formed with wall portions indicated at 53b shaped to engage the inner side of the face panel 21′ of the preform when the rim portion 53a is disposed adjacent the level of the open side of the preform. Advantageously, the inner shaping member is formed with a grid-like structure in which the preform-engaging wall portions 53b are formed on the ends of ribs 53c. As shown, at least one rib extends lengthwise of the inner shaping member, and one or more ribs extend crosswise of the inner shaping member, with the outer ends of the ribs contoured generally complementary to the inner side of an undistorted preform for engaging the top, bottom, front, rear and side panels 21′–25′ of the preform to aid in shaping the same and in guiding the preform into position around the inner shaping member.

The outer shaping member 55 has the inner margin 55a thereof adjacent its end shaped to conform to the outer margin of an undistorted preform adjacent the juncture of the side walls of the preform with the web.

The outer shaping member is thus adapted to engage the outer side of the preform adjacent the juncture of the side walls with the web to compensate for any outward distortion of the preform and to clamp the preform to the inner shaping member. A punch face is formed on one of the shaping members and preferably on the outer shaping member, as shown at 55c, which punch face is adapted to engage the web in a marginal area around the side walls of the preform, and the outer margin 55d of the outer shaping member adjacent the punch face 55c is shaped complementary to the trim die opening 52.

The inner and outer shaping members are mounted at opposite sides of the preform for movement relative thereto into and out of preform-clamping position. It is deemed apparent that movement of the shaping members relative to the preform and movement of the shaping members and preform relative to the trim die could be effected in various different ways. However, in the preferred embodiment illustrated, the trim die 51 is made stationary and the shaping members are moved relative thereto. Alternatively, the trim die could be mounted for movement and one or the other of the shaping members held stationary, if desired. As shown, the trim die 51 is mounted on a die plate 61 supported as by brackets 62 on a base plate 63. As shown in FIG. 1, upper and lower support plates 64 and 65 are mounted as by legs 66 and 67 in fixed relation respectively above and below the base plate. The inner shaping member 53 is carried by a lower bolster 69 guidably supported by rods 71 in the lower support plate for movement toward and away from the trim die. Any suitable means such as a fluid actuator 73 having a movable actuator rod 74 may be provided for moving the inner shaping member. The outer shaping member is carried by an upper bolster plate 75 which is guidably mounted on rods 76 extending between the upper support plate and the base plate for movement relative to the trim die. Any suitable means such as a fluid actuator 78 having an actuator rod 79 may be provided for effecting movement of the outer shaping member relative to the trim die. The web W overlies one side of the trim die, and one of the shaping members is supported at the side of the trim die 51 opposite the side engaged by the web W of thermoplastic material and is movable through the trim die into engagement with the preform. In the preferred embodiment illustrated, the web W overlies the upper side of the trim die and the inner shaping member is movable through the trim die and into the preform at the upper side thereof. The trimmed articles are preferably discharged from the trim die by pressing the same downwardly therethrough and, for this purpose, the die plate 61 and base plate 63 have openings 61a and 63a respectively which are dimensioned sufficiently large to allow the trimmed article to pass downwardly therethrough. In other words, the openings 61a and 63a are preferably at least as large as the outer margin 53d of the outer shaping member 55. A stripper plate 82 is preferably provided for stripping the trimmed articles off the inner shaping member as it is lowered and, as shown, the stripper plate is supported below the base plate 63 a distance at least equal to the depth of the trimmed article, and the stripper plate has an opening 82a therein, sufficiently large to allow the inner shaping member to pass therethrough, but which is yet sufficiently small to engage the marginal flange 27 on the trimmed article to strip the same off the inner shaping member during retraction.

The upper shaping member is movable downwardly into a position around the outer side of the preform as shown in FIG. 3. A clamp and ejector plate 88 is preferably provided inside the outer shaping member to engage the outer side of the face panel 21′ on the preform to clamp the same to the inner shaping member. The plate 88 is yieldably supported from movement relative to the outer shaping member, as shown in FIG. 4, and is yieldably urged as by springs 89 in a direction toward the open side of the outer shaping member to yieldably clamp the preform to the inner shaping member when the latter is inside the preform and to eject the preform from the outer shaping member when the inner shaping member moves away from the outer shaping member. Web clamps 91 may be provided for clamping the web to the trim die around the preform. As best shown in FIG. 4, the web clamps are supported for movement with the outer shaping member into and out of web clamping position and are movable relative to the outer shaping member. For this purpose, the web clamps are mounted by guide rods 93 which are slidably supported in the upper bolster plate 75. The web clamps are yieldably urged to a position extending beyond the punch face 55c of the outer shaping member by springs 94, and heads 95 on the guide rods constitute stops for limiting movement of the web clamps.

As previously described, the cup-shaped articles shown in FIG. 12 have a bottom panel 23 which is reversely inclined with respect to the plane of the web, that is, is inclined downwardly and outwardly with respect to the plane of the web at an angle of less than 90° so that the completed container can rest on its bottom without rocking substantially on the bottom flange. In such articles, it is desired to trim the flange so that the outer edge of the flange on the bottom panel of the trimmed article does not lie substantially outwardly of the perpendicular projection of the inclined bottom panel on the plane of the web. The method and apparatus of the present invention is adapted for trimming thermoformed articles having this configuration. This can be achieved by moving the inner and outer shaping members relative to the preform P along paths generally paralleling the inclined bottom panel 23′ of the preform into engagement with the inner and outer sides of the preform, and by then moving the inner and outer shaping members in unison relative to the trim die along a path generally paralleling the inclined bottom panel. This is conveniently achieved in the disclosed apparatus by supporting the trim die 51 at an angle as shown in FIG. 1 with respect to the path of reciprocation of the inner and outer shaping members, which angle is complementary to the angle between the outer face of the inclined bottom panel of the preform and the web. As will be seen, the walls of the die opening 52, die plate 61 and base plate 63 generally parallel the path of movement of the outer shaping member 55. The punch face 55c on the outer shaping member is preferably inclined with respect to the axis of the outer shaping member so as to generally parallel the inclined trim die, as is clearly shown in FIG. 1.

The method and apparatus is also adapted for trimming articles as shown in FIG. 12, having a spout flange 32 disposed in a plane perpendicular to the plane of the article flange 27. As best shown in FIGS. 7–11, the outer shaping member has a spout punch 96, the outer face 96a of which is disposed adjacent the plane of the outer side of the spout flange portion 32′. The end face 96b of the spout punch is made arcuate to conform to the spout portion 31′ of the preform to receive the same, and a recess 96c is formed in the outer face of the spout punch, the radial width and axial depth of which recess generally corresponds to the radial width and axial thickness of the spout flange forming portion 32′ on the preform. The recess 96c receives the spout flange portion 32′ as the outer shaping member is pressed through the trim die so that the spout flange 32′ is severed from the wall portion 33′ of the preform along a line adjacent the juncture therebetween as shown in FIG. 8. A cooperating spout die member 97 is provided on the trim die 51 and is shaped as shown in FIG. 9 generally complementary to the inner side of the wall portion 33′ on the preform and cooperates with the spout punch 96 to sever the spout flange from the wall 33′. As shown in FIG. 7, the spout flange portion 32' is inclined with respect to the path of movement of the spout punch, due to the aforedescribed inclination of the trim die used for the reverse bottom. In practice this does not adversely affect the trimming of the spout flange since the spout flange 32' is received in the recess 96c during the punching operation, and the spout merely deforms somewhat as shown in FIG. 8 during punching so as to generally parallel the path of movement of the spout punch.

The method and apparatus is also adapted to punch holes in the preform inwardly of the margin of the preform, as is useful in forming the finger-receiving openings 29 for articles of the type shown in FIG. 12. This is conveniently achieved by providing a hole punch member designated 101 on one of the shaping members such as the outer shaping member and a cooperating hole die member designated 102 on the other or inner shaping member. As shown in FIG. 1, the hole punch member has its punch face 101a disposed at a level somewhat below the punch face 55c on the outer shaping member and is arranged to interfit with the hole die 102 on the inner shaping member when the inner and outer shaping members are moved into preform-clamping position, as shown in FIG. 3, to thereby punch the hole in the preform inwardly of the margin thereof.

Movement of the inner and outer shaping members respectively into engagement with the inner and outer sides of the preform to clamp the same therebetween and subsequent movement of the inner and outer shaping members in unison relative to the trim die may be effected either under manual control or an automatic control such as diagrammatically shown in FIG. 1. The actuator 73 for the inner shaping member is conveniently air-operated from a source 110 under the control of a reversing valve 111 having supply and exhaust ports 111a and 111b and controlled ports 111c and 111d. The controlled ports are connected through lines 112 and 113 to the fluid actuator 73, and a valve operator 115 is provided for reversibly operating the valve 111. The actuator 78 for the outer shaping member is preferably hydraulically operated under the control of a reversing valve 116 having an inlet port 116a connected to a pump 117 and an outlet port 116b connected to the reservoir 118. The controlled outlet ports 116c and 116d are connected to the fluid actuator 78 through lines 120, and a valve operator 119 is provided for reversibly operating the valve. The operators 115 and 119 may be of any conventional type, for example, electro-responsive or fluid-responsive operators and which are adapted to be controlled by a conventional sequence control mechanism 121. The sequence control is arranged to operate the valves 111 and 116 to sequentially elevate the inner shaping member as shown in FIG. 2 to a position engaging the inner side of the preform; lower the outer shaping member as shown in FIG. 3 to a position engaging the outer side of the preform and with the punch face 55c engaging the web; thereafter press the punch face 55c on the outer shaping member through the web and into the die opening 52 as shown in FIG. 4 to punch the preform from the web; and then retract the inner and outer shaping members to the position shown in FIG. 6. The inner shaping member is yieldably maintained in engagement with the inner side of the preform during punching and, for this purpose, the pressure on the air supply for the actuator 73 is made substantially lower than the hydraulic pressure exerted by the upper shaping member so that the inner shaping member can move downwardly under the force exerted by the outer shaping member, to thereby yieldably maintain the inner shaping member in clamping engagement with the preform. After the preform has been punched from the web, the upper actuator is retracted to the position shown in FIG. 6, and the lower actuator is fully lowered. As the inner shaping member passes through the stripper plate 82, the trimmed article is stripped from the inner shaping member. The trimmed article can be removed either manually or by a pusher shown at 125, conveniently operated by a fluid actuator 126. The latter is conveniently reversibly operated under the control of a valve 127 having an operator 128 conveniently controlled by the sequence control mechanism 121.

From the foregoing it will be seen that the method and apparatus of the present invention is adapted to trim preformed articles from a web and to provide a flange which is uniform on successive articles, notwithstanding any shrinkage or distortion which may have occurred in the preform before trimming of the same. The method and apparatus is also adapted for trimming preforms of the type having a reversely inclined wall, and moreover, can be used to trime articles having a flange portion disposed in a plane normal to the plane of the web. In addition, the method and apparatus can be used to punch openings in the preforms inwardly of the margins thereof.

What is claimed as new is:

1. The method of trimming cup-shaped preforms from a web of plastic material wherein the preforms have side walls extending transverse to the plane of the web comprising, engaging the inner and outer faces of at least some of the side walls of a preform in the region adjacent the web between inner and outer shaping members to conform the open side of the preform to the preselected shape of the shaping members, engaging a punch face on one of said shaping members with one side of the web in a marginal area extending outwardly from at least some of the side walls of the preform, and effecting relative movement between said one of said shaping members and a die having an opening shaped complementary to the outer margin of said punch face on said one of said shaping members while maintaining said other shaping member in engagement with the preform to punch a cup-shaped article with a marginal flange along at least some of the side walls from the web of plastic material.

2. The method of trimming cup-shaped preforms from a web of plastic material wherein the preforms have side walls extending transverse to the web comprising, effecting relative movement of inner and outer shaping members along relatively parallel paths disposed transverse to the web respectively into engagement with the inner and outer faces of the side walls of the preform in the region adjacent the web to laterally locate the side walls of the preform, engaging a punch face on one of said shaping members with the web in a marginal area extending outwardly from at least some of the side walls of the preform, and effecting relative movement along a path generally paralleling said first mentioned paths between said one of said shaping members and a trim die having an opening shaped complementary to the outer margin of said punch face on said one of said shaping members while maintaining the other shaping member in engagement with the preform to punch a cup-shaped article with a marginal flange from the web of plastic material.

3. The method of claim 2 wherein the preform has one side wall with its outer face disposed at an angle of less than 90° with respect to the plane of the web, and said paths of movement of said inner and outer shaping members extend generally parallel to said one side wall of the preform.

4. The method of claim 2 including the step of punching an opening in said preform inwardly of said marginal flange area during movement of said inner and outer shaping members into engagement with the preform.

5. The method of claim 2 including moving a hole punch on one of said shaping members through an area on said preform inwardly of said marginal area and into a hole die on the other of said shaping members as said inner and outer shaping members move into engagement with the preform to punch an opening in said preform inwardly of said marginal flange area.

6. The method of trimming cup-shaped preforms from a web of plastic material wherein the preforms have side walls extending transverse to the web comprising, positioning a hollow punch around the outer side of the preform with an inner margin of the punch engaging the side walls of the preform and with an outer margin of the punch spaced outwardly from the inner margin a distance corresponding to the desired flange width, positioning an inner shaping member inside the preform with the outer margin thereof engaging the side walls of the preform, and thereafter punching the preform from the web by moving the inner and outer shaping members in unison relative to a trim die shaped complementary to the outer margin of the punch.

References Cited

UNITED STATES PATENTS

| | | | |
|---|---|---|---|
| 1,904,268 | 4/1933 | Bronson | 264—153 |
| 2,839,306 | 6/1958 | Bayless | 83—914 X |
| 3,240,851 | 3/1966 | Scalora | 264—153 |

ANDREW R. JUHASZ, Primary Examiner

J. F. COAN, Assistant Examiner

U.S. Cl. X.R.

83—914; 264—153, 155